United States Patent

Fischbach

[15] 3,642,407
[45] Feb. 15, 1972

[54] MOVING MECHANISM FOR INJECTION MOLDING MACHINES OR THE LIKE

[72] Inventor: Alfred Fischbach, Am Scheffert, Ruenderoth, Germany

[22] Filed: May 1, 1970

[21] Appl. No.: 33,585

Related U.S. Application Data

[62] Division of Ser. No. 664,566, Aug. 30, 1967, abandoned.

[30] Foreign Application Priority Data

Sept. 6, 1966 Germany ..................... F 50128

[52] U.S. Cl. ........................................... 425/242, 100/253
[51] Int. Cl. ................................................ B29f 1/00
[58] Field of Search ............... 18/16 H, 16 C, 30 LK, 30 LV, 18/30 LA, 30 LU, 30 WP; 100/253

[56] References Cited

UNITED STATES PATENTS

| 2,280,849 | 4/1942 | Pocock | 18/16 C X |
|---|---|---|---|
| 2,331,015 | 10/1943 | Dawes et al. | 18/16 |
| 3,270,372 | 9/1966 | Hesse | 18/30 LV |
| 2,396,539 | 3/1946 | Smith et al. | 18/30 LV UX |
| 3,158,903 | 12/1964 | Fischer et al. | 18/30 LM |
| 3,160,919 | 12/1915 | Carter | 18/30 LM X |

Primary Examiner—J. Spencer Overholser
Assistant Examiner—Michael O. Sutton
Attorney—Michael S. Striker

[57] ABSTRACT

A moving mechanism for an injection molding machine comprising a main drive for moving the movable mold section into and away from sealing engagement with the stationary mold section and an auxiliary drive for initial disengagement of the movable mold section from the stationary section against the opposition of the molded article in the mold cavity. The auxiliary drive is arranged to operate between a stationary support member and a platen carrying the movable mold section. The main drive and the auxiliary drive are both connected to the movable mold section and by effecting initial opening of the mold by the auxiliary drive, the main drive, which has to carry out a longer stroke than the auxiliary drive, can be constructed relatively weak.

7 Claims, 4 Drawing Figures

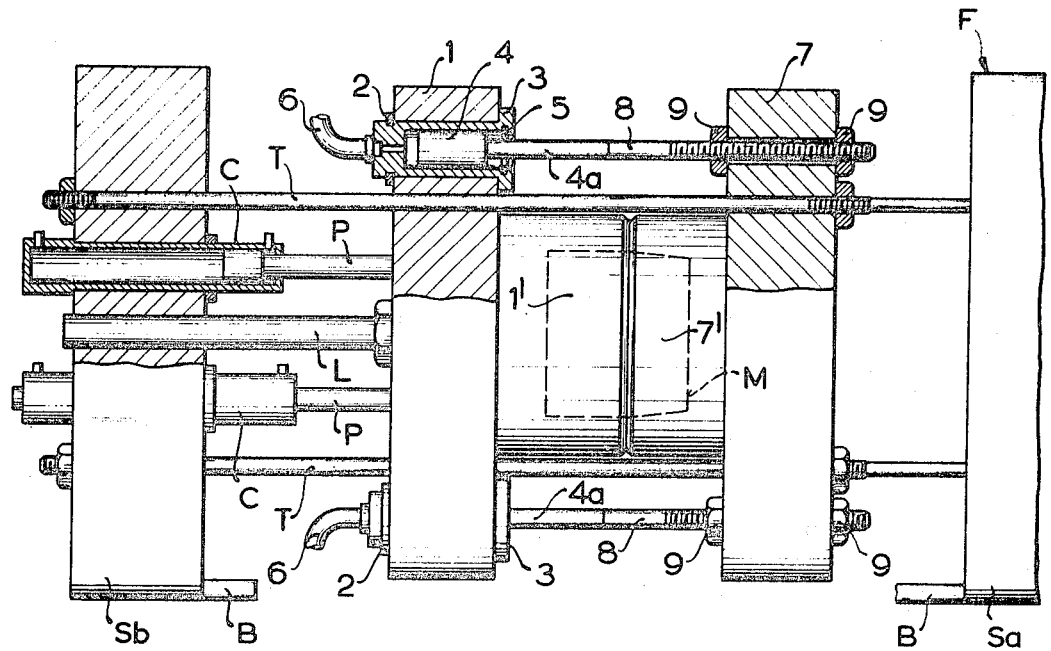
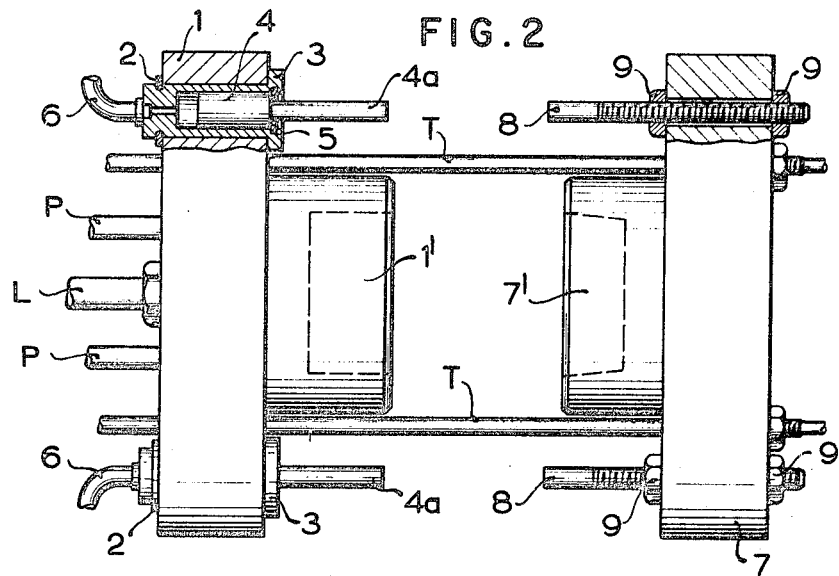

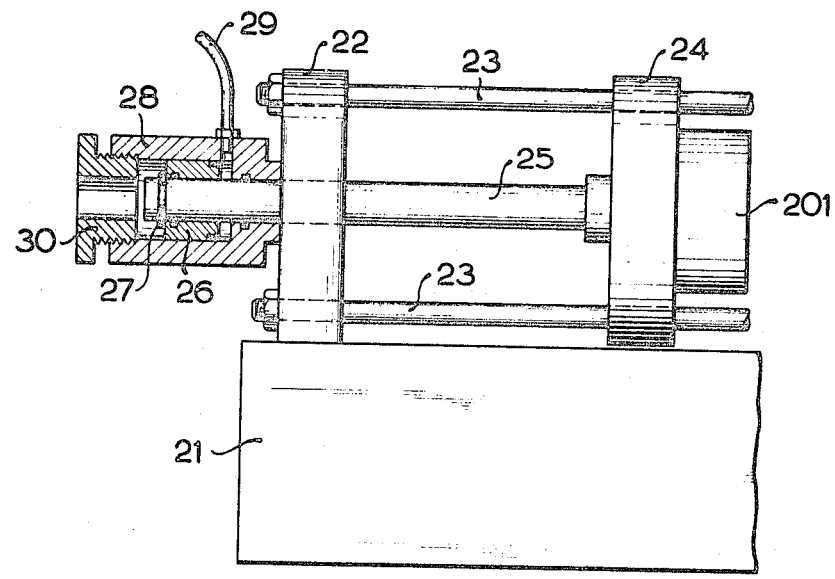
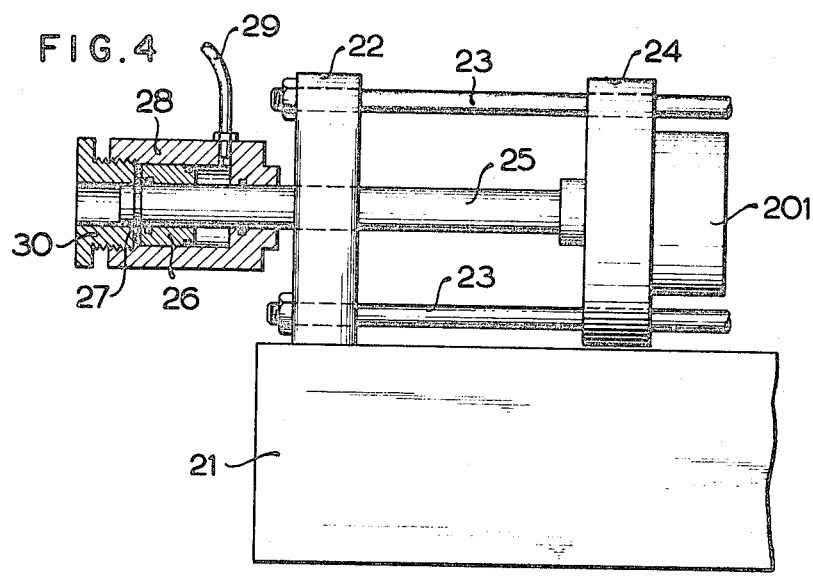
INVENTOR
Alfred FISCHBACH
his ATTORNEY

MOVING MECHANISM FOR INJECTION MOLDING MACHINES OR THE LIKE

CROSS-REFERENCES TO RELATED APPLICATIONS

The present application is a divisional application of the copending application, Ser. No. 664,566 filed Aug. 30, 1967, and now abandoned.

BACKGROUND OF THE INVENTION

The present invention relates to molding machines in general, and more particularly to improvements in clamping and moving mechanisms of injection molding machines or the like. Still more particularly, the invention relates to improvements in the construction, mounting and operation of drive means which are employed in mechanisms of molding machines to move the mold sections toward and away from each other.

The clamping and moving mechanism or unit of an injection molding machine for the production of plastic articles includes those parts which support, open and close the mold and maintain it in closed and locked position under requisite clamping pressure. The second unit of an injection molding machine is constituted by the injection assembly which converts solid particles into a deformable mass and injects such mass into the cavity or cavities defined by the mold sections when the mold is closed. The mold sections are mounted on platens at least one of which is reciprocable to respectively close and open the mold.

A serious drawback of many presently known injection molding machines is that the drive which effects opening and closing of the mod must produce very large forces which are necessary in order to separate the molded article or articles from the wall or walls surrounding the cavity or cavities in the mold sections. The molded article offers a considerable resistance to opening of the mold, especially if the mold cavities are bounded by slightly conical surfaces. In other words, in the initial stage of movement of a mold section to open position, the drive which effects such movement must overcome friction between the movable platen and the frame of the clamping mechanism as well as the resistance offered by the hardened molded article or articles to such opening. Therefore, the drive must be designed to produce very large forces even when the displacement of the movable platen and the respective mold section to fully open position and from fully open position back to closed position requires relatively small forces. This means that, if the drive employs a hydraulic cylinder and piston unit, the cylinder must receive very large amounts of a pressure medium in order to effect displacement of the movable platen from open to closed position or vice versa. Also, displacement of the movable platen consumes too much time. The same holds true if the mold is opened and closed by a system of toggle links or by other mechanical drive means. Furthermore, mechanical drive means are likely to undergo deformation when the molded article offers an unexpectedly high resistance to opening of the mold.

SUMMARY OF THE INVENTION

It is an important object of the present invention to provide a moving mechanism for injection molding or like machines wherein the drive which reciprocates the movable mold section between fully open and closed positions need not produce substantial forces even if the molded articles offer a very high resistance to opening of the mold.

Another object of the invention is to provide the moving mechanism wherein actual disengagement of a freshly molded article from the mold sections need not be effected by that drive which reciprocates a portion of the mold between fully open and closed positions.

A further object of the invention is to provide a moving mechanism wherein the drive which effects full opening and closing of the mold is protected from excessive stresses and is merely required to overcome friction which develops between the frame and the movable platen of the moving mechanism.

Briefly outlined, my present invention is embodied in a moving mechanism for molding machines, particularly injection molding machines. The mechanism comprises a mold including a plurality of mold sections at least one of which is movable between an open and a closed position, in which latter position of the one section the sections engage each other and define at least one mold cavity for plasticized material which, after setting, forms a molded article tending to oppose disengagement of mold sections and the movement of the one section to open position, main drive means for moving the one mold section between the fully open and closed positions, and auxiliary drive means for initially disengaging the one mold section by overcoming the opposition of the article in the mold cavity. Such auxiliary drive means may comprise a fluid-actuated cylinder and piston unit arranged between the platen which carries the movable mold section and the frame of the molding machine. The stroke of such unit is preferably adjustable so that the one mold section can be disengaged from the remainder of the mold and can be moved toward open position through a distance which suffices to insure that the main drive can thereupon move the one section to fully open position by exerting a relatively small force, i.e., by using relately small amounts of fluid which need not be subjected to very high pressure, if as customary, the main drive means includes one or more hydraulic or pneumatic cylinder and piston assemblies.

The novel features which are considered as characteristic for the invention are set forth in particular in the appended claims. The improved moving mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly elevational and partly sectional view of a clamping and moving mechanism which forms part of an injection molding machine, the mold of the clamping mechanism being shown in closed position;

FIG. 2 illustrates a portion of the structure shown in FIG. 1, with the mold in open position;

FIG. 3 is a fragmentary partly elevational and partly sectional view of a clamping and moving mechanism, according to the present invention wherein the movable platen is held in an end position corresponding to closed position of the mold; and FIG. 4 illustrates the structure of FIG. 3 but with the movable platen in the other end position.

DESCRIPTION OF THE PREFERRED EMBODIMENTS

While the construction according to the present invention is shown in FIGS. 3 and 4 of the appended drawings, FIGS. 1 and 2 have been included in the present application in order to facilitate a better understanding of the device according to the present invention.

Referring first to FIGS. 1 and 2, there is shown the clamping and moving mechanism of an injection molding machine for plastic material. The mechanism comprises a frame F having a base B carrying two stationary supports Sa and Sb. The supports Sa, Sb are connected with the ends of guide means including a set of parallel horizontal tie rods T which guide a reciprocable platen 1 for movement toward and away from a second platen 7 which is preferably but need not be rigidly affixed to the tie rods T and/or to another part of the frame F. The customary injection assembly (not shown) is mounted in or on the support Sa and includes a shooting cylinder serving to inject plasticized material into one or more mold cavities M defined by two mold sections 1', 7' which are respectively rigid with the platens 1 and 7. The left-hand support Sb carries a main drive which serves to move the platen 1 between first and second positions respectively corresponding to open and closed positions of the mold section 1'. This mean drive includes two double-acting hydraulic cylinders C each having a piston rod P which is connected with the platen 1 and can move the latter from the position shown in FIG. 2 to the position shown in FIG. 1 and vice versa. A locking rod L serves for locking the mold in the position of FIG. 1 in a manner well known from the art of conventional injection molding machines. When in the position of FIG. 1, the platen 1 maintains the mold section 1' in closed or sealing position in which the sections 1', 7' engage with each other and define the aforementioned cavity or cavities M for reception of plasticized material. When the material in the mold cavity M sets, it opposes disengagement of the mold sections 1', 7', i.e., it opposes movement of the platen 1 from the second position of FIG. 1 to the first position of FIG. 2. The resistance of a molded article to opening of the mold is particularly strong if at least one of the sections 1', 7' has internal surfaces which are nearly parallel to the direction of movement of the platen 1 along the tie rods T.

The mechanism comprises a second or auxiliary drive which serves to disengage mold section 1' from mold section 7' upon completion of an injection molding operation, i.e., after the material in the cavity M sets and forms a molded article which opposes disengagement of the mold sections and the operation of the main drive (cylinders C and piston rods P). The auxiliary drive includes a set of equidistant fluidactuated cylinder and piston units which operate between the platens 1 and 7 and serve to move the platen 1 away from the platen 7 against the opposition of the article in the mold cavity M. In the embodiment of FIGS. 1 and 2, the auxiliary drive comprises two units each of which has a relatively short hydraulic cylinder 3 received in an axially parallel bore of platen 1 and held against lengthwise displacement by a split ring 2 or the like. Each cylinder 3 accommodates a reciprocable piston 4 having a piston rod 4a which extends toward the platen 7. Rings 5 which are inserted into the cylinders 3 limit the forward strokes of the respective pistons 4 in a direction toward the platen 7. Conduits 6 connect the cylinders 3 with a suitable pump which can supply oil or another liquid pressure medium in response to actuation of programmed control valves which are not shown in the drawings. The cylinders 3 require relatively small amounts of pressure medium because the pistons 4 need not perform long working strokes, i.e., they merely displace the platen 1 from the end position shown in FIG. 1 to break the freshly formed article in the cavity M away from the section 1' and/or 7'.

The platen 7 carries a pair of adjustable stops in the form of threaded spindles 8 which can be fixed in selected axial positions by nuts 9. The left-hand end portions of the spindles 8 extend into the path of movement of the piston rods 4a and serve as stops to prevent rightward movement of the pistons 4. It is clear that the adjustable stops or spindles 8 can be mounted on the frame F or on the tie rods T, as long as they can effectively oppose movement of pistons 4 toward the mold section 7'. Also, the main drive can include mechanical, electrical, pneumatic or electromechanical or electropneumatic means for moving the platen 1 between the positions shown in FIGS. 1 and 2. All that counts is to provide the clamping mechanism with a main drive which can move one of the mold sections 1', 7' between fully open and closed positions and with an auxiliary drive which can facilitate the operation of the main drive by overcoming the resistance which an article in the mold cavity M offers to disengagement of the mold sections.

The operation is as follows:

The cylinder C causes the piston rod P to move the platen 1 to the position shown in FIG. 1 whereby the mold section 1' engages with the mold section 7' and defines therewith a mold cavity M. The sections 1', 7' can be locked to each other by locking rod L in a manner which is well known from the art of conventional injection molding machines so that the sections can withstand substantial injection pressures which develop when the aforementioned injection assembly admits plasticized material into the mold cavity. The cylinders 3 are disconnected from the source of pressurized fluid so that the piston rods 4a need not bear against the stops 8.

Upon completion of the injection cycle, the material in the mold cavity M is allowed to set and is thus converted into a molded article which should be ejected from the cavity in order to allow for the start of a fresh cycle. Such rapid ejection necessitates movement of the platen 1 to the position shown in FIG. 2 to provide a so-called mold opening (namely the maximum distance necessary to allow for ejection of the plastic article from the space between the mold sections 1' and 7').

When the article in mold cavity M is ready to be ejected, the locking mechanism of the clamping mechanism is disengaged and the valves which regulate the flow of pressurized fluid in the conduits 6 are actuated to admit fluid into the left-hand chambers of the cylinders 3. Such fluid displaces the pistons 4 toward the platen 7 whereby the piston rods 4a bear against the stops 8. In response to further admission of fluid into the cylinders 3, the platen 1 and the cylinders 3 begin to move away from the platen 7 and overcome the opposition of the molded article whose material adheres to the surface bounding the mold cavity M with a force which depends on the size of the article, on the inclination of surfaces bounding the mold cavity, and on the material of the article. Once the auxiliary drive has overcome the resistance offered by the article to opening of the mold, the main drive (cylinder C) takes over and returns the platen 1 all the way to the position shown in FIG. 2 in which the article can be readily ejected from the section 1' or 7' by means of conventional knockout pins or the like (not shown). Thus, the auxiliary drive facilitates the work of the main drive and renders it possible to employ for the main drive a relatively small cylinder C which utilizes small amounts of a pressure medium. This will be readily understood since, once the auxiliary drive overcomes the resistance which the plastic material offers to opening of the mold, it requires relatively little force to move the platen 1 and mold section 1' along the tie rods T.

A very important advantage of my clamping mechanism is that it can employ a main drive which requires small amounts or hydraulic pressure medium because this main drive must overcome only such forces which develop in response to sliding engagement between the platen 1 and tie rods T. The much larger forces which are needed to disengage the mold section 1' from the mold section 7' during the initial stage of the opening movement are produced by the auxiliary drive which also requires relatively small amounts of pressure medium because its pistons need not perform long working strokes. It was found that the clamping mechanism of my invention operates with substantial savings in pressure medium despite the fact that it employs a larger number of hydraulic cylinder and piston units than presently known clamping mechanisms. Additional savings are achieved because the amounts of material needed for the manufacture of cylinders forming part of my main and auxiliary drives are less than those needed to produce a relatively large cylinder and piston unit which moves the reciprocable platen all the way between its end positions and which must also overcome the resistance of articles to opening of the mold.

The adjustability of stops 8 in the platen 7 renders it possible to employ the clamping mechanism for the production of a variety of plastic articles. Thus, the mold sections 1', 7' can be replaced by differently dimensioned and/or configurated mold sections which must be moved away from each other through a distance which is greater or less than the distance between the mold sections 1', 7' in FIG. 2. All that is needed to convert the clamping mechanism for the production of different molded articles is to replace the sections 1', 7' and (if necessary) to change the axial position of the stops 8.

Referring now to FIGS. 3 and 4 there is shown a portion of a further clamping and moving mechanism which comprises a frame including a base 21 carrying a support 22 corresponding to the support Sb of FIG. 1, and tie rods or guide means 23 which connect support 22 with a second support (not shown)

corresponding to the support Sa of FIG. 1. The movable platen 24 carries a mold section 201 which corresponds to the mold section 1' of FIG. 1 and is movable toward and away from engagement with a second mold section (not shown) mounted on a second platen or directly on the second support corresponding to the support Sa.

The main drive is not shown and may be realized in the manner shown in and described in connection with FIG. 1. A rod 25 is slidably guided in the support 22 and is bolted to the platen 24. The locking unit which blocks opening of the mold when the platen 24 maintains the mold section 201 in closed position is not shown in the drawing. Rod 25 may serve as a locking rod similar to rod L in FIG. 1 and 2, for instance in connection with a clamping unit (not shown) mounted on support 22 and selectively engageable with rod 25. The left-hand end portion of the piston rod 25 constitutes a plunger and carries an annular piston 26 which is reciprocable in the chamber of a cylinder 28. A motion transmitting ring 27 on the piston rod 25 limits the movement of piston 26 in a direction to the left, as viewed in FIG. 3 or 4. The cylinder 28 is not connected to the frame, i.e., it can move toward and away from the left-hand side of the support 22. This cylinder 28 constitutes with the piston 26 an auxiliary drive which effects partial opening of the mold through the intermediary of the main drive to assist the main drive in effecting full opening of the mold. A conduit 29 can admit hydraulic pressure medium to that chamber of the cylinder 28 which is located to the right of the piston 26. An externally threaded stop 30 meshes with the cylinder 28 and extends into the path of movement of the ring 27.

The operation is as follows:

When the mold is closed, the piston rod 25 assumes the position shown in FIG. 3. The mold is then locked in closed position in a manner well known from conventional injection molding machines and the mold section 201 engages with the other mold section to define therewith one or more mold cavities. When the article in the mold cavity is sufficiently cooled and is ready to be ejected from the mold, the locking unit is disengaged and the auxiliary drive is set in operation to move the section 201 at least slightly away from the other mold section. This is achieved by admitting a pressure medium through the conduit 29 whereby the pressure medium causes the cylinder 28 to bear against the support 22 and to shift the piston 26 in a direction to the left and against the ring 27. In response to further admission of fluid via conduit 29, the piston 26 bears against the ring 27 and displaces the piston rod 25 in a direction to the left to thereby effect partial opening of the mold through the intermediary of the main drive. The stroke of the piston rod 25 in response to admission of fluid through the conduit 29 is completed when the ring 27 moves into abutment with the stop 30. By adjusting the axial position of the step 30, the personnel in charge can select the distance covered by the movable platen 24 and mold section 201 in a direction away from the other platen and the other mold section in response to operation of the auxiliary drive. The manner in which the mold section 201 is then moved to the fully open position of FIG. 4 in response to operation of the main drive is not shown in FIGS. 3 and 4. Such main drive can further include the aforementioned cylinder for the piston rod 25 or it may comprise separate cylinder and piston units similar to that shown in FIG. 1.

The mechanism of FIGS. 3 and 4 can be modified in a number of ways without departing from the spirit of my invention. For example, the annular piston 26 can be arranged to move into direct abutment with the stop 30 if the latter's right-hand end face is provided with a recess for the ring 27. Moreover, the piston rod 25 need not be directly connected with the platen 22, i.e., it can act against one or more stops (not shown) provided on the platen 22 and/or mold section 201 to move the part 22 or 201 away from the other mold section in response to admission of fluid through the conduit 29.

An advantage of the mechanism shown in FIGS. 3 and 4 is that it can employ platens and mold sections of conventional design. All that is necessary is to install in a conventional clamping mechanism the parts which are shown to the left of the support 22. Thus, the auxiliary drive is not installed in the space between the stationary supports of the frame (namely, between the support 22 and the other support which corresponds to the support Sa of FIG. 1) whereby the mold sections of the clamping mechanism are more readily accessible to facilitate inspection, replacement and/or repair of the mold sections as well as rapid ejection of molded articles. The effective surface of the annular piston 26 is selected in such a way that this piston can produce forces which are needed to effect initial opening of a mold wherein the article or articles offer a very high resistance to movement of the platen 24 from the position shown in FIG. 3. Moreover, and since the auxiliary drive is mounted outside of the actual molding station, its parts are readily accessible and can be installed and/or removed with little loss in time. The stop 30 is always adjusted in such a way that the auxiliary drive consumes as little pressure medium as possible while still effecting satisfactory disengagement of mold section 201 to facilitate the work of the main drive. A modern injection molding machine must produce large numbers of articles per unit of time; therefore, even small savings in pressure medium are of considerable importance for economy of operation and for achieving a higher output.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A moving mechanism for molding machines, particularly for injection molding machines, comprising a mold including two sections only one of which is movable between an open and a closed position in which said sections engage each other and define at least one mold cavity for plasticized material which, after setting, forms a molded article tending to oppose disengagement of said sections and the movement of said one section to open position; support means for supporting said one section movable between said positions thereof and comprising a stationary member extending transverse to the movement of said one section; main drive means cooperating with said one section for moving the latter between fully open and closed positions; and auxiliary drive means also cooperating with said one section for initially disengaging said sections from each other while overcoming the opposition of the article in said cavity, said auxiliary drive means comprising a cylinder located at and abutting with one end thereof against that side of said stationary member which faces away from said mold, a piston slidably received in said cylinder, a piston rod connected at opposite ends to said piston and to said one section, respectively, and means for feeding pressure fluid into said cylinder between said one end thereof and said piston.

2. A mechanism as defined in claim 1, and including adjustable stop means for limiting the extent of movement of said rod and cylinder relative to each other.

3. A mechanism as defined in claim 2, wherein said stop means comprises a threaded member meshing with said cylinder.

4. A mechanism as defined in claim 2, wherein said stop means comprises a threaded member threadingly connected to the other end of said cylinder.

5. A mechanism as defined in claim 1, wherein said rod is arranged coaxially with said one section, and wherein said stationary member is formed within an opening through which said rod extends slidably guided therein.

6. A mechanism as defined in claim 1, and including a platen connected to said one mold section on the side thereof facing away from the other mold section, said rod being fixed at one end thereof to said platen coaxial with said one mold section, and guide means fixed to said stationary member and cooperating with said platen for guiding the latter and said one mold section connected thereto during movement relative to the other mold section.

7. A moving mechanism for molding machines, particularly for injection molding machines, comprising first stationary means comprising a stationary support member extending in a first direction; a second stationary means comprising a stationary mold section; a movable mold section movable relative to said stationary mold section in a second direction transverse to said first direction between a fully open and a closed position in which said sections engage each other and define at least one mold cavity for plasticized material which, after setting, forms a molded article tending to oppose disengagement of said sections and the movement of said movable section to said open position; main drive means cooperating with said movable section for moving the latter between said positions thereof; and auxiliary drive means including fluid actuated means comprising at least one cylinder member and at least one combined piston and piston rod member movable relative to said cylinder member from a first to a second position upon feeding of pressure fluid into said cylinder member, said combined piston and piston rod member being connected to said movable mold section and said cylinder member abutting loosely against that side of said stationary member which faces away from said movable mold section to initially move said movable mold section away from said stationary mold section during movement of the combined piston and piston rod member from said first to said second position while permitting said cylinder member to move out of abutment with said stationary member during movement of the movable mold section by said main drive means to said fully open position so that said auxiliary drive means may operate along a shorter stroke than that main drive means.

* * * * *